May 10, 1960 C. HILL 2,936,035
VEHICLE BRAKING SYSTEM
Filed April 3, 1956 6 Sheets-Sheet 1

Inventor.
Claude Hill.
By Carlson, Pitzner, Hubbard & Wolfe
Attys.

May 10, 1960 C. HILL 2,936,035
VEHICLE BRAKING SYSTEM
Filed April 3, 1956 6 Sheets-Sheet 3

Inventor:
Claude Hill.
By Carlson, Pitzner, Hubbard & Wolfe
Attys.

May 10, 1960 C. HILL 2,936,035
VEHICLE BRAKING SYSTEM
Filed April 3, 1956 6 Sheets-Sheet 4

Inventor:
Claude Hill.
By Carlson, Pitzner, Hubbard & Wolfe
Attys.

May 10, 1960 C. HILL 2,936,035
VEHICLE BRAKING SYSTEM
Filed April 3, 1956 6 Sheets-Sheet 5

Inventor.
Claude Hill.
By Carlson, Pitzner, Hubbard & Wolfe
Attys.

May 10, 1960

C. HILL 2,936,035

VEHICLE BRAKING SYSTEM

Filed April 3, 1956

Inventor.
Claude Hill.
By Carlson, Pitzner, Hubbard & Wolfe
Attys.

United States Patent Office 2,936,035
Patented May 10, 1960

2,936,035

VEHICLE BRAKING SYSTEM

Claude Hill, Roselawn, Kenilworth, England, assignor to Harry Ferguson Research Limited, Abbotswood, Stow-on-the-Wold, England, a British company Application April 3, 1956, Serial No. 575,727

Claims priority, application Great Britain April 6, 1955

6 Claims. (Cl. 180—44)

The present invention relates to vehicle braking systems, and more particularly to braking systems for vehicles of the general type disclosed in U.S. Letters Patent Nos. 2,796,942, 2,796,943, and 2,816,616, all assigned to the assignee of the present invention. Thus this invention concerns motor vehicles having all four wheels independently suspended on the vehicle by means of a convergent link type suspension system. In such arrangements, the wheels are associated with separate power driven half axles universally pivoted to the vehicle chassis for up-and-down suspension movement. It has been found that such independent wheel suspension systems afford extreme improvement in the performance of the vehicle resulting in enhanced vehicle riding qualities.

It is a general object of the present invention to provide an improved vehicle braking system capable of effectively braking independently suspended driven half axles while at the same time permitting axial movement of the half axles due to their up-and-down swinging movement as the vehicle wheels follow the contour of the ground.

Another object of the invention is to provide in a four wheel vehicle a braking system which evenly distributes the vehicle braking load over three uniformly sized brake units so located within the vehicle as to supply a greater braking torque at the front wheels where the greatest portion of the braking force is derived due to the front location of the motor and other heavy vehicle components. More specifically, it is an object to provide three similarly sized brake units so located within the vehicle as to each supply a substantially equal share of the vehicle braking torque, two of the brake units being associated with the front two wheels, respectively, and the third brake unit being adapted to brake the rear wheels.

Yet another object is to provide a brake system of simplified design, having three brake units light in weight, and susceptible of economical production. An ancillary object in this respect is to provide a braking system wherein the individual brake units employed are identically constructed so that standardization is possible with consequent reduction in the cost of production.

Other objects and advantages of the invention will become apparent upon reading the attached detailed description in conjunction with the accompanying drawings, in which.

While the invention has been illustrated and is described in some detail with reference to a particular embodiment thereof, there is no intention that it be thus limited to such detail. On the contrary, it is intended here to cover all modifications, alternations, and equivalents falling within the spirit and scope of the invention as defined by the appended claims.

Figure 1:
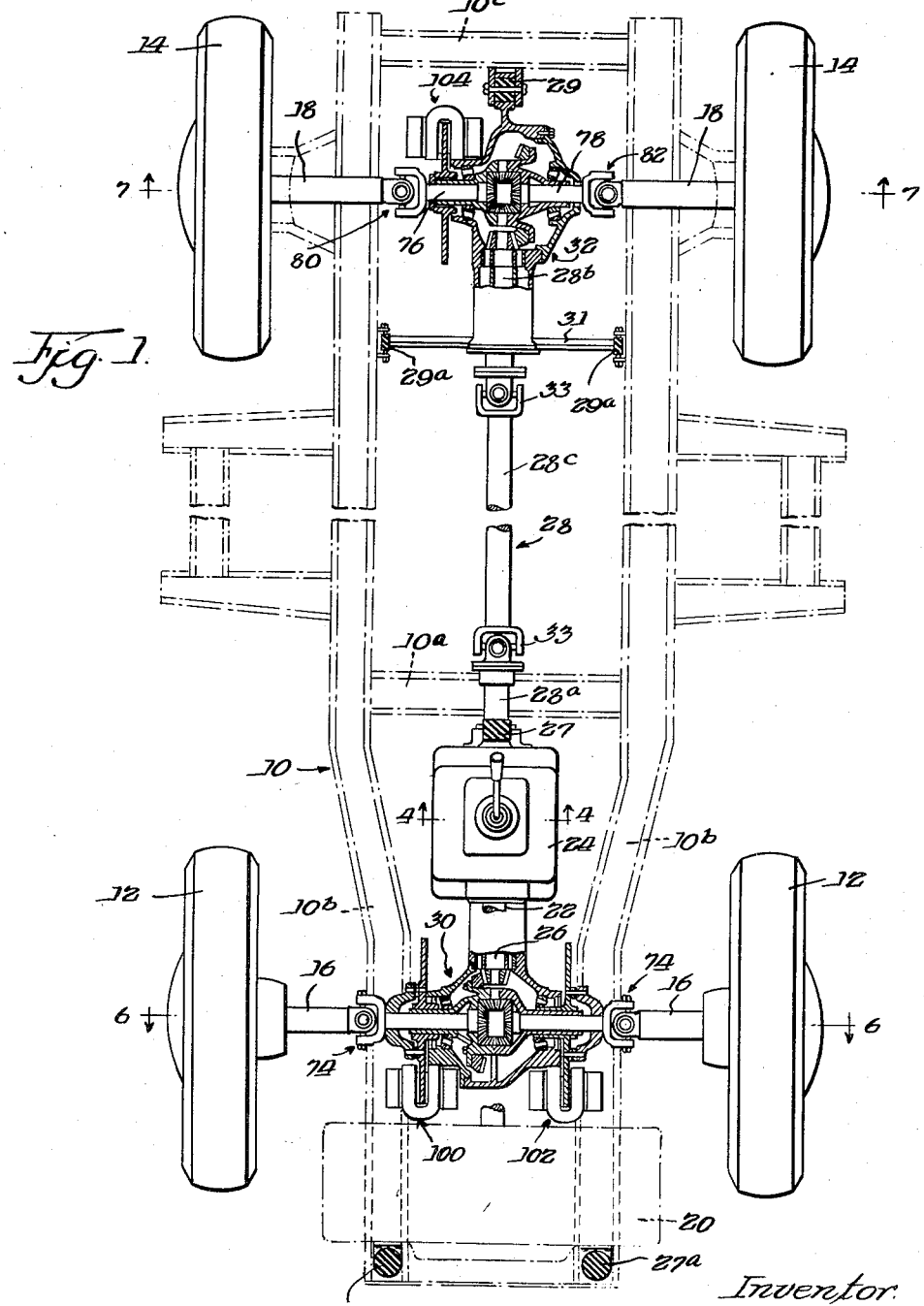
Fig. 1 is a fragmentary plan view, partly in section, showing the general outline of a vehicle chassis and illustrating the power transmitting components and the braking system employed in practicing the invention. To promote clarity of illustration the body portion of the vehicle and the wheel suspension system have not been shown.

Referring now to the exemplary vehicle here illustrated, there is shown in Fig. 1 a vehicle chassis including an elongated frame 10 from which front and rear pairs of pneumatically tired ground wheels 12, 14, respectively, are individually suspended. The front wheels 12 are driven through swingable half axles 16 and are adapted for vertical springing movement. The mounting and suspension of these wheels is preferably as described and claimed in the above-mentioned U.S. Letters Patent No. 2,796,943. The rear wheels 14 are driven through swingable half axles 18 and are independently suspended preferably as described and claimed in the above-mentioned U.S. Letters Patent No. 2,816,616.

The exemplary vehicle is intended to have a four wheel drive, that is, both the front and rear wheels 12 and 14 are traction wheels. To drive all four wheels, the prime mover and power transmission means are mounted on the vehicle chassis. The prime mover appears as an engine 20 mounted at the front over the steerable front wheels 12. The power transmission means (not shown) may take any of various forms, including for example a hydraulic torque converter.

Output from the torque converter is transmitted through the input shaft 22 of a differential gear box 24 disposed intermediate the ends of the vehicle. The intermediate or center differential gear box 24 is interposed between and serves to drive substantially aligned front and rear propeller shafts 26, 28. The propeller shafts, in turn, are connected to the front and rear pairs of half axles 16 and 18 through front and rear inter-wheel differential gear boxes 30, 32, respectively. As will be seen, the rear propeller shaft 28 includes a pair of relatively short end portions 28a, 28b which connect directly with the center and rear differential gear boxes 24, 32, respectively, and a relatively long central shaft portion 28c coupled to the end portions 28a, 28b by means of spaced universal joints 33.

Rigid mounting is provided for the center and front differentials 24 and 30 and the rear differential 32 at the front and rear, respectively, of the vehicle chassis. Thus the center and front differentials 24, 30 are rigidly interconnected with the engine 20 as a unit, this unit being mounted on the frame 10 at three points forming the apices of a triangle. A rear mounting 27 is provided between the casing of the center differential 24 and the frame cross member 10a and two front mountings 27a are shown between the engine 20 and the front end of the longitudinal frame members 10b. Likewise, the casing of the rear differential 32 is secured to a rear frame cross member 10c by a mounting 29, while a forward portion of the casing is supported by a cross plate 31 having mountings 29a to the frame members 10b. The mountings 27, 27a, 29, 29a are preferably formed of rubber or the like to take on shock absorbing qualities although any conventional mounting means may be employed if desired.

Figure 4:
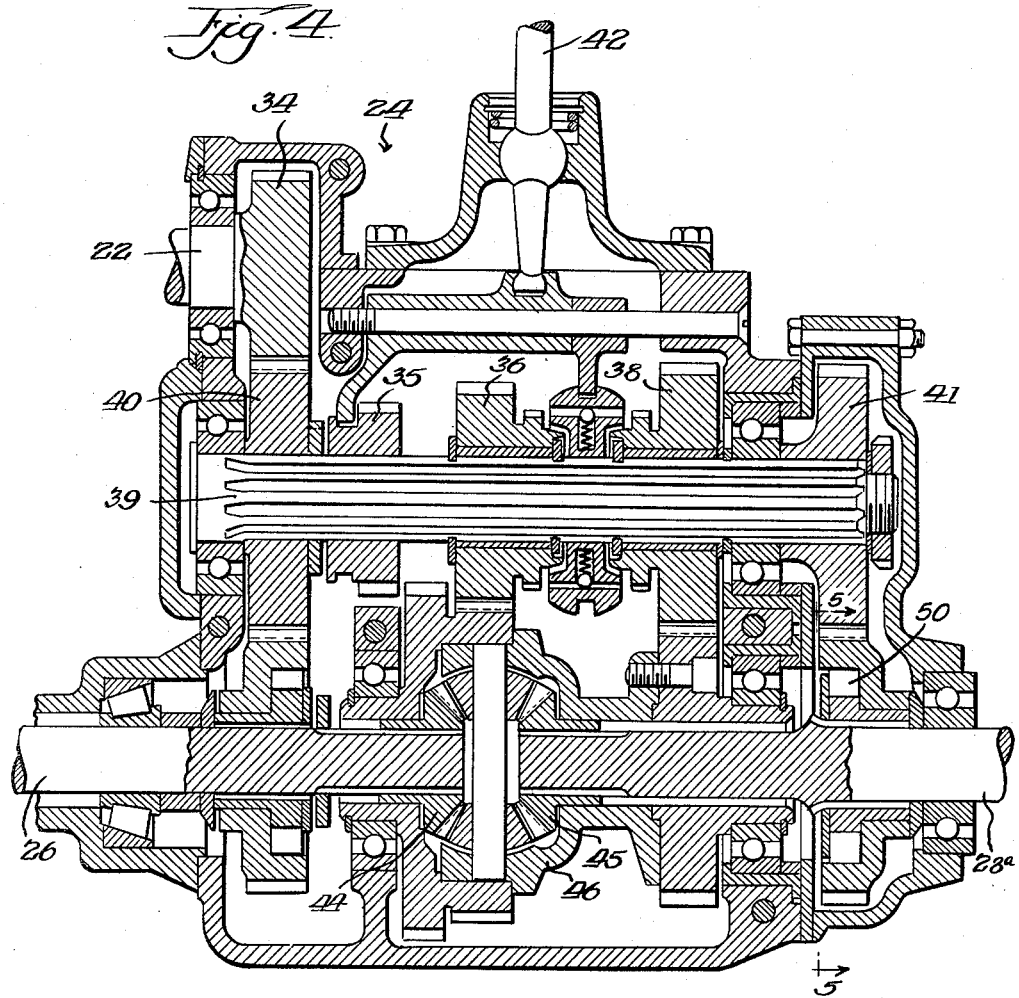
Fig. 4 is a vertical sectional view of the center differential gear box taken substantially along the line 4—4 in Fig. 1.
Figure 5:
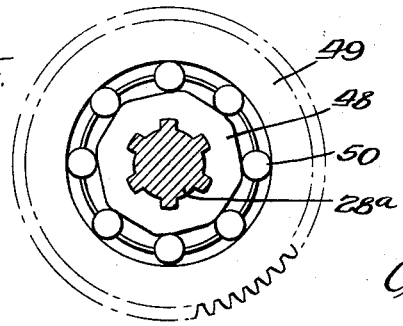
Fig. 5 is a detail sectional view taken substantially along the line 5—5 in Fig. 4, showing the construction of an exemplary one-way overrun device employed in the center differential gear box.

The above-mentioned power transmission means including the intermediate differential gear box 24 is preferably constructed generally as described and claimed in the above-mentioned U.S. Letters Patent No. 2,796,942. Although reference may be had to that patent for the details of construction and operation of the transmission, it will be helpful for purposes of the present invention to briefly describe the general orientation and function of the component parts of the center differential 24 as here illustrated. Thus, referring particularly to Figs. 4 and 5, the differential 24 is driven from the shaft 22 through an input gear 34. Multispeed gears 35, 36 and 38 are splined to a shaft 39 journaled in the differential casing and carrying end gears 40 and 41, the former gear drivingly meshing with the input gear 34. The gears 35, 36 and 38 form the main components of a multi-speed transmission which is under the control of a gear shifting hand lever 42. The lower portion of the gear box 24 includes two differential terminal elements 44, 45 here shown as bevel sun gears, splined to the propeller shafts 26 and 28a and an intermediate planet gear carrier 46 adapted to be rotationally driven from the three gears 35, 36 and 38, as selected using the hand lever 42.

One-way overrunning clutch means is included in the differential gear box 24 to prevent stalling of the entire vehicle due to slippage of one wheel. Such clutch means is drivingly interposed between one of the propeller shafts 26, 28a and a shaft driven directly from the prime mover. As shown the clutch means includes splined to each propeller shaft 26, 28a a driver member 48, a surrounding overrunning member 49 driven from one of the end gears 40, 41, and a plurality of balls or rollers 50. The driver member 48 and overruning member 49 may turn freely due to slippage of the rollers 50 relative to one another as long as the latter turns faster than the former. However in the event that a wheel should lose traction and spin, causing the speed of the driver member 48 to exceed that of the overrunning member 49, then the rollers 50 wedge against the outer edge surface of the overrunning member and lock the two members together for drive in unison. When this occurs the respective one of the sun gears 44, 45 is locked rigidly to the planet gear carrier 46 through the overrunning member 49, the gear 41, the shaft 39 and one of the pairs of change speed gears. With the differential thus locked, its two terminal elements 44, 45 must turn in unison so that the other propeller shaft is positively driven and the vehicle is not completely stalled.

Figure 6:
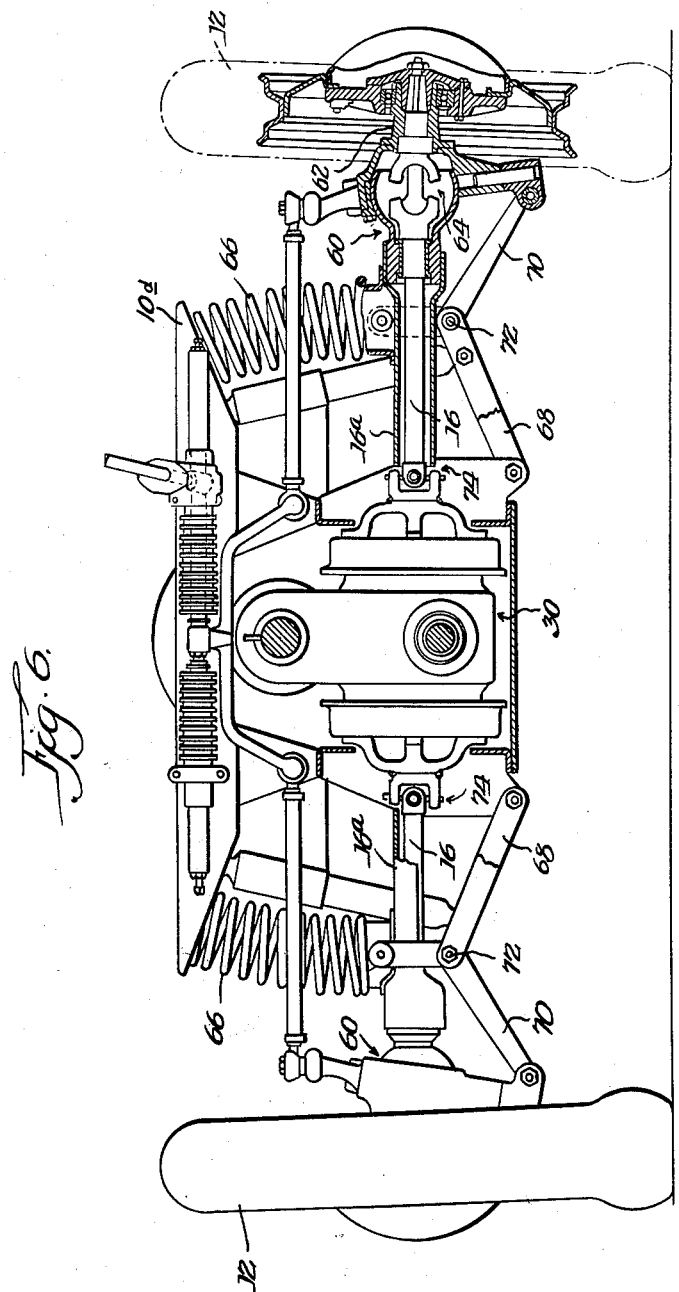
Fig. 6 is a partially sectioned rear elevation of the front wheel suspension for the vehicle, taken substantially along the line 6—6 in Fig. 1.
Figure 7:
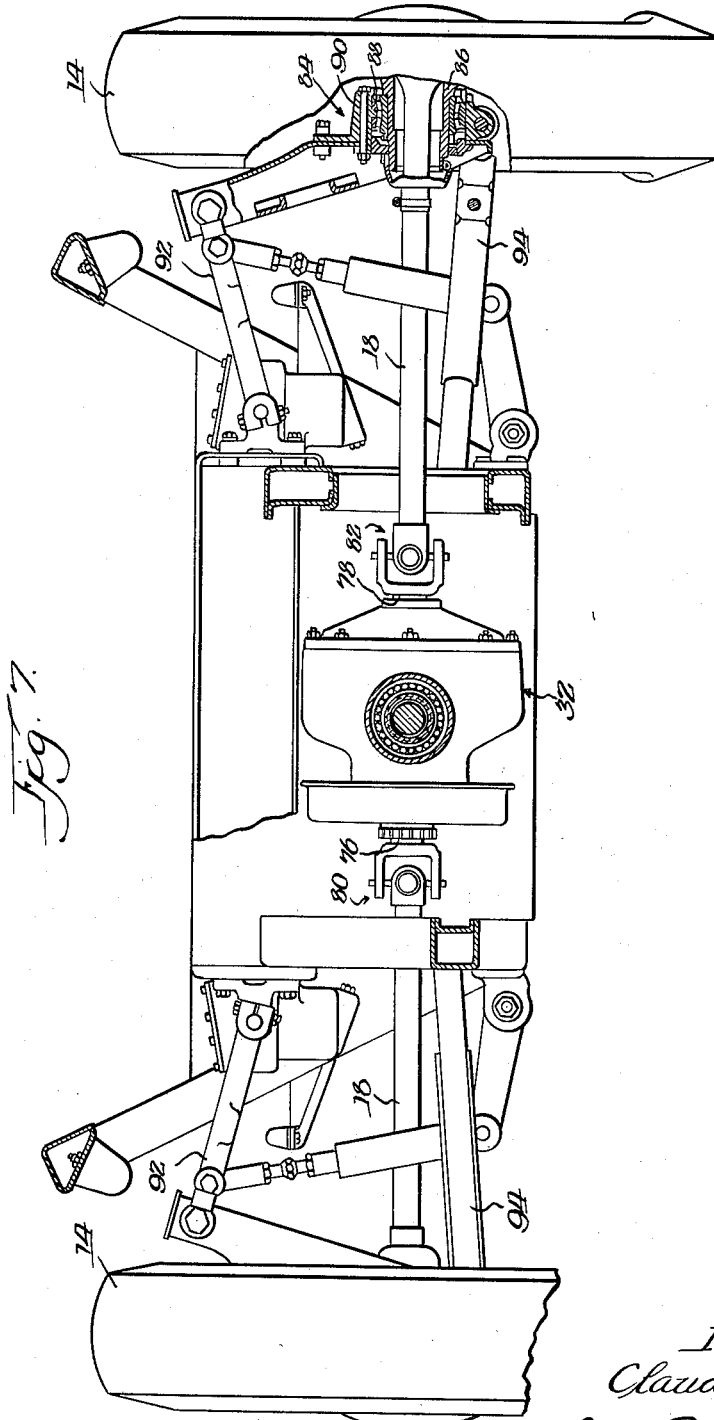
Fig. 7 is an elevational view, partly in section, of the rear wheel suspension for the vehicle, taken substantially along the line 7—7 in Fig. 1.

Turning now to Figs. 6 and 7 there is shown the wheel suspension employed in the illustrative vehicle, the details of which may be had upon reference to the above-mentioned patents.

With respect to the front wheel suspension, it suffices to say that each of the front wheels 12 is mounted by a hub assembly which includes a hollow ball and socket casing 60 adapted to receive therein a stub axle 62 about which the wheel is journaled. The stub axle 62 is universally coupled to the outer end of the half axle 16 by a constant velocity type universal joint 64. A live connection is thus established between the front inter-wheel differential 30 and each of the front wheels 12, permitting each of the wheel and half axle assemblies to swing vertically with respect to the vehicle frame, and also permitting each wheel to swing universally about the end of the half axle for steering purposes. Spring means for the front suspension arrangement are provided by vertically disposed coil springs 66 interposed between a transverse frame member 10d and casings 16a surrounding the half axles 16.

In order to control the canting of the wheel and thus reduce lateral tire scrub, a control linkage for the suspension is provided in the form of two links 68 and 70 pivoted to a common point on a stub link 72 swingingly depending from each casing 16a. The control linkage for the half axle suspension is completed by a rearwardly extending brace (not shown) pivoted at its forward end to the same fore and aft axis on the casing 16a as the swinging stub link 72, and extending rearwardly and inwardly for a pivotal connection (not shown) to a rearward point on the vehicle frame 10. This latter mentioned brace restrains the axle 16 against swinging in a horizontal plane while at the same time permitting vertical swinging movement.

During springing movement, for example, upward bounding of the wheel on a road bump, the front half axle 16 swings upwardly about a universal joint 74 interposed between the axle and the front differential 30. As more fully explained in the above mentioned patent, such upward movement of the half axle 16 causes the two control links 68, 70 to jack-knife with respect to one another about their common pivot point, with the result that the second link 70 tilts the wheel 12 inwardly at the bottom with respect to the outer end of the half axle. Such action produces a compensatory effect, reducing the tire scrub on such bumps. A similar but reversely operating compensatory action obtains when the axle 16 swings downwardly, for example, when the wheel encounters a depression or hole in the ground surface.

With regard to the rear wheel suspension, it will be seen from Fig. 7 that linkage is provided for permitting each of the half axles 18 to swing relative to the vehicle frame 10. For present purposes it is sufficient to state that the rear half axles 18 are drivingly connected to a pair of aligned and oppositely directed output shafts 76, 78 or terminal elements of the rear differential 32 by means of universal joints 80, 82 respectively.

For the universal mounting of each rear wheel 14, a hub assembly 84 is provided through which the axle 18 extends for connection to the wheel by means of a Hooke type universal joint. The assembly 84 includes an annular hub 86, the cylindrical portion of which is journaled by a suitable bearing 88 within a bearing housing 90, the angular canting of the wheel 14 relative to the axle 18 being determined by the controlled positioning of the housing.

The control link means for the rear wheels 14 includes top and bottom links 92, 94 pivoted at their outer ends to the housing 90 and at their inner ends to the frame 10. These links are oriented to converge inwardly as shown; that is, the vertical distance between their outer ends is greater than that between their inner ends. Although the detailed operation of the suspension linkage will not be discussed here, it will be pointed out that the converging action of the control links 92, 94 is extremely advantageous in mitigating pitch, sway, and lateral tire scrub as the vehicle encounters bumps or negotiates curves.

It is seen then that the convergent link-type wheel suspension employed in the exemplary vehicle enables both the front and rear half axles to swing up-and-down about a point located near the center of the vehicle to minimize lateral tire scrub. One of the requisites of such up-and-down motion is that the half axles must undergo a limited amount of axial shifting movement in following the action of the convergent link arrangement. At the same time the half axles must be adaptable to be effectively braked when it is desired to reduce the speed of the vehicle or bring it to a stop.

Accordingly, provision is made for effectively braking the front and rear half axles 16, 18 while at the same time permitting limited axial movement of the half axles as required due to the compulsion of the convergent link wheel suspension system. This is done by providing a vehicle braking system including a plurality of braking units arranged and constructed to be capable of exerting a braking torque on the vehicle half axles irrespective of their movement axially.

Provision is also made for simplifying the brake system by utilizing a minimum number of components while at the same time meeting the different braking requirements of the front and rear road wheels as necessitated by the fact that the front wheels carry a greater proportion of the vehicle load and thus require more braking torque than the rear wheels. This is accomplished by providing in the vehicle braking system only three braking units for use with the four wheels, a pair of front wheel braking units 100, 102 operatively associated with the front differential 30 and a single rear braking unit 104 associated with the rear differential 32.

Figure 2:
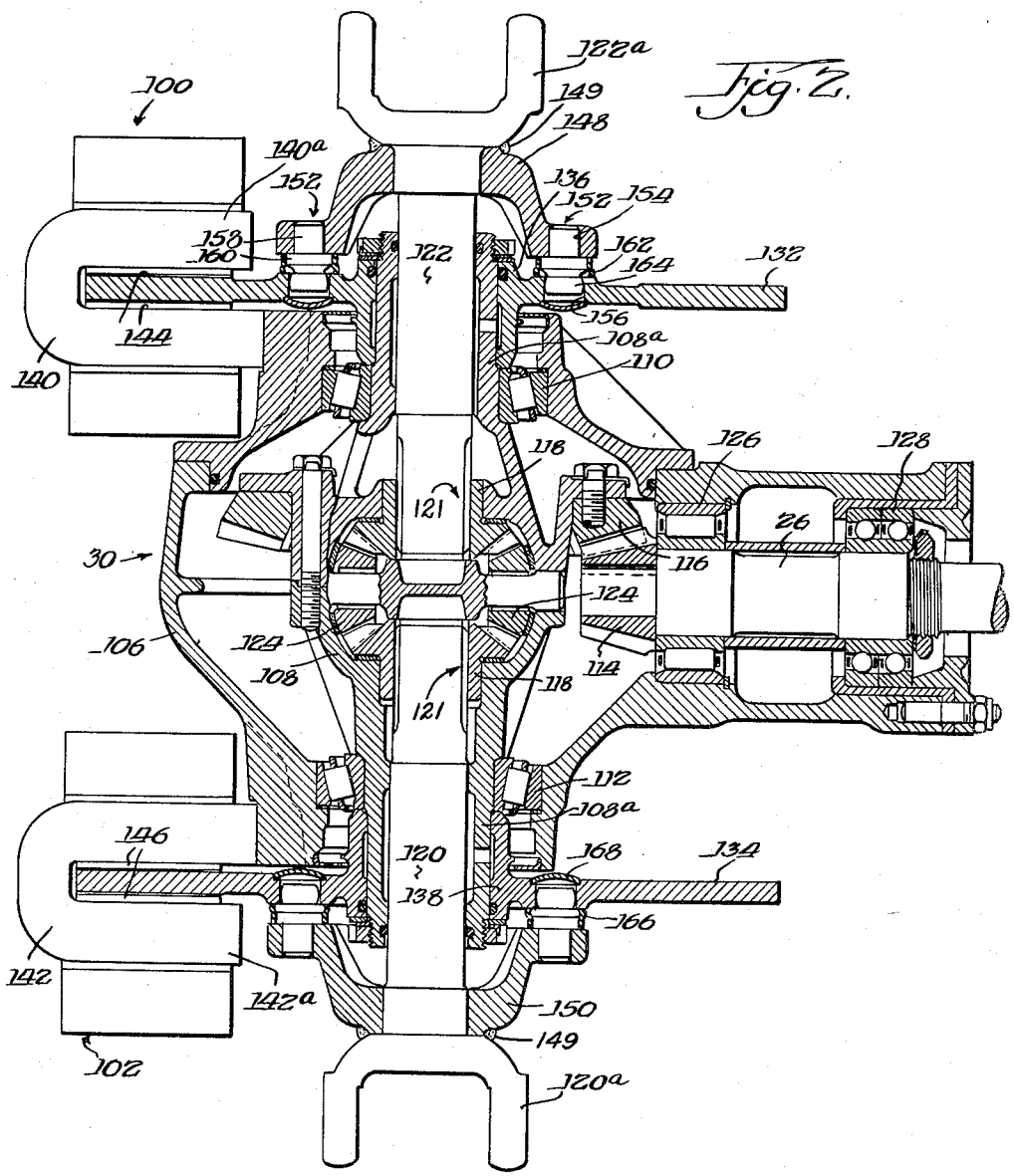
Fig. 2 is an enlarged sectional plan view of the front braking means and front differential gear box shown in Fig. 1.

Referring more particularly to Fig. 2 of the drawings, it will be seen that the front differential 30 includes a casing 106 housing a transverse elongated planet gear carrier 108 mounted in end bearings 110, 112 within the casing. Power is transmitted from the front propeller shaft 26 through a bevel pinion gear 114 mounted thereon and enmeshed with a large bevel gear 116 which circumferentially girds the planet gear carrier 108 and is rigid therewith. Disposed in the central portion of the planet gear carrier 108 are a pair of opposing and spaced apart output bevel gears or sun gears 118 rotatively secured to axially aligned differential terminal elements or output shafts 120 and 122, and a pair of transverse bevel gear planet wheels 124 mounted on the carrier 108 and meshing with the sun gears 118. As shown the front propeller shaft 26 is rotatable in bearings 126 and 128 which are mounted in a rearwardly extending cylindrical portion of the casing 106.

Attention is drawn to the mounting of the differential output shafts 120, 122 within the planet gear carrier 108. As will be seen the outer ends of the shafts 120, 122 are journaled in sleeve-like extensions 108a of the planet gear carrier 108. Means for accommodating axial movement of these shafts within the differential 30 is provided in the form of a splined connection 121 between the sliding output shafts 120, 122 and the axially fixed output sun gears 118. In this way the shafts 120, 122 are capable of undergoing limited axial plunging movement when required to do so by the motion of the half axles 16. Bifurcated portions 120a and 122a integrally formed on the outer ends of the differential output shafts are shaped to cooperate with the inner end portions of the half axles 16 to form a pair of universal joints 74 (Fig. 1).

Mounted at opposite sides of the differential casing 106 are the identically constructed disc-type brake units 100 and 102. As will be seen, the brake units 100, 102 include flat disc-shaped braking elements 132, 134, respectively, which are integrally formed with central hub portions 136, 138, respectively, each of the hubs being rotatively journaled upon the sleeve-like extensions 108a of the planet gear carrier 108. Conventional brake shoes 140, 142, respectively, having a horseshoe shaped cross section and having their inner surfaces faced with suitable friction linings 144 and 146 are provided for cooperating with the braking discs 132, 134 to effect braking action. Operation of the brake units 100, 102 to apply braking torque may be effected by squeezing the ends of the brake shoe legs 140a, 142a toward one another and into engagement with the friction linings 144, 146. Hydraulic or other conventional actuation means may be employed for urging the brake shoe legs inwardly.

Means is provided for drivingly coupling the output shafts 120, 122 of the front differential 30 to the braking elements 132, 134, respectively, while yet permitting axial sliding movement of the shafts relative thereto. In this way the braking elements and output shafts are securely engaged for unit rotational movement; still the output shafts are free to shift axially a limited amount as required by the motion of the half axles in the convergent link suspension system. Thus each differential output shaft 120, 122 is connected with its adjacent brake disc 132, 134 by means of a bifurcated coupling element 148, 150, respectively, secured in any suitable fashion, as by welding 149, to the outer end portions of the differential output shafts. For drivingly engaging the coupling elements 148, 150 with the braking elements 132, 134, a pair of diametrally opposed pins 152 are received through aligned openings 154, 156 provided in each coupling element and each brake disc, respectively. As will be seen from the drawings each of the pins 152 has a cylindrical shank portion 158 adapted to be received in one of the openings 154 in the coupling element, a cylindrical shoulder 160 arranged to be interposed between the coupling element and the brake disc, a reduced neck portion 162 and a partly spherical head 164, the latter being adapted to slidably engage one of the openings 156 provided in the brake disc. Thus the pins 152 furnish a driving connection as between the brake discs 132, 134 and the differential output shafts 120, 122, with axial movement of the coupling elements 148, 150 toward and away from the brake discs being afforded by the axial sliding motion of the pin heads 164 in the disc openings 156. The partly spherical shape of the pin heads 164 enables the heads to rock slightly in the disc openings 156 if necessary to compensate for any slight misalignment of the differential output shafts 120, 122 without adversely affecting the drive connections between these shafts and the brake discs 132, 134.

To seal the connecting pins 152 and the openings 154, 156 in which they are carried from dust and dirt the shoulder and neck portions 160, 162 of each pin are protected by an annular rubber sleeve 166, and the head end of each opening 156 in the brake discs is closed by a rubber cap 168. In this way entry of grit or water to the sliding surfaces is prevented.

Figure 3:
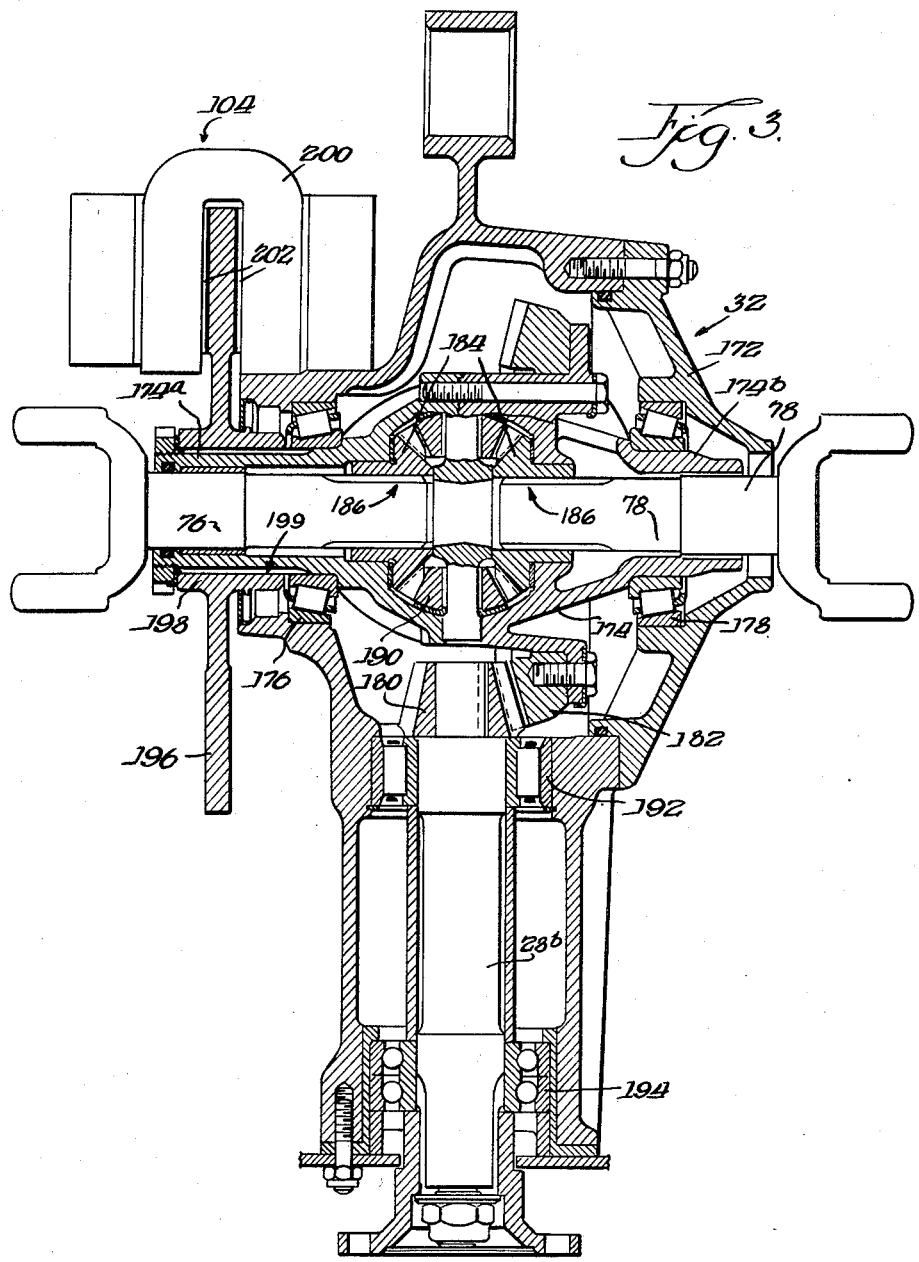
Fig. 3 is an enlarged sectional plan view of the rear braking means and rear differential gear box shown in Fig. 1.

Turning now to the details of the rear differential 32 and the braking means associated with the rear vehicle wheels 14, reference is made to Fig. 3. As will be seen the rear differential 32 is very similar in construction to the front differential 30 above described. Thus the rear differential 32 includes a casing 172 supported by suitable means (Fig. 1) from the chassis frame 10. Housed within the casing 172 is a transverse elongated planet gear carrier 174 mounted in end bearings 176, 178 within the casing. Power is transmitted from the rear propeller shaft 28b through a bevel pinion gear 180 mounted thereon and enmeshed with a large bevel gear 182 which circumferentially girds the planet gear carrier 174 and is rigid therewith. Disposed in the central portion of the planet gear carrier 174 are a pair of opposing and spaced apart output bevel gears or sun gears 184 rotatively secured to the axially aligned rear differential output shafts 76, 78, and a pair of transverse planet gears 190 mounted on the carrier 174 and meshing with the sun gears 184. Rotational support for the rear propeller shaft 28b is provided by spaced bearings 192 and 194 which are mounted in a forwardly extending cylindrical portion of the casing 172.

Again, the rear differential output shafts 76, 78 are mounted within the planet gear carrier 174 in such a manner as to provide for limited axial movement of the shafts, the latter being connected by means of the universal joints 80, 82 with the rear half axles 18. Thus, the outer ends of the shafts 76, 78 are journaled in sleeve-like extensions 174a, 174b of the planet gear carrier 174, and a splined connection 186 is provided between the inner ends of the shafts 76, 78 and the axially fixed output sun gears 184.

Only one rear brake unit 104 is employed for braking both rear vehicle wheels 14. The brake unit 104 is substantially identical in size and construction with the front brake units 100, 102 and as shown is mounted on one side of the rear differential casing 174. As will be seen the casing 172 is assymetrically formed and one of the planet gear carrier sleeves 174a is longer than the other 174b for neatly accommodating the brake unit 104. The brake unit 104 comprises a disc type braking element 196 having an integrally formed central hub 198, the latter being keyed at 199 to the longer carrier sleeve 174a for rotation therewith. A conventional brake shoe 200 horseshoe shaped in cross section and having its inner surfaces faced with friction linings 202 is provided for cooperating with the braking element 196 to effect braking action.

Attention is drawn to the rigid connection of the braking disc 196 with the planet gear carrier 174 of the rear differential 32. Such an arrangement enables braking torque to be exerted directly on the planet gear carrier 174, which latter component drives both of the rear wheels 14. The single rear brake unit 104 divides the braking torque required equally between the two rear wheels because of the equal torque division characteristics inherent in the action of the rear differential 32. Of course the three brake units 100, 102 and 104 are actuated simultaneously under normal driving conditions. Moreover, any overflow of braking torque from the front of the vehicle to the rear is also divided by the rear differential 32. It should also be noted that while the braking torque is applied to the input to the rear differential 32, rather than the output, still this torque is not applied directly to the relatively high speed input propeller shaft 28b. Rather the braking torque is applied to the relatively low speed planet gear carrier 174 which rotates normally at the same speed as the half axles 18 and the rear road wheels 14. The mounting of the brake disc 196 on the planet gear carrier 174 is also advantageous in that the relatively widely spaced bearings 176, 178 in which the carrier is journaled also provide stable support for the brake disc, thus avoiding the need for separate bearings for the latter.

Since no braking elements are carried by the output shafts 76, 78 of the rear differential 32, these shafts by virtue of their splined connections with the sun gears 184 are free to shift axially with the independently suspended half-axles 18. Location of the splined output shaft connections within the differential casing 172 facilitates lubrication of these parts, and the arrangement is also advantageous in that the shafts may be easily withdrawn from the casing for repair or replacement.

One of the advantageous features of the invention resides in the provision of a vehicle braking system having three similar braking units, two for the front wheels and one for the rear wheels, which brake units are so located as to substantially equally apportion the braking load carried per brake unit. Such a three brake system offers simplification of design and reduction in weight as compared to conventional four brake systems, with resultant advantageous reductions in the cost of production.

I claim as my invention:

1. In an automotive vehicle having front and rear propeller shafts driven from a center differential, front and rear differentials each having an intermediate element driven from a respective one of said propeller shafts and two terminal elements, and front and rear pairs of half axles carrying traction wheels and drivingly connected to the terminal elements of the front and rear differentials, the combination comprising three substantially identical brake elements, means journaling two of the brake elements on the intermediate element of the front differential, means connecting said two brake elements to respective ones of the front differential terminal elements for rotation therewith, means non-rotatably connecting the third of said brake elements to the intermediate element of said rear differential, and three substantially identical friction elements, each of said last-named elements being stationarily mounted on the vehicle adjacent a corresponding one of said brake elements and adapted to have pressurized frictional engagement with respective ones of said brake elements.

2. In an automotive vehicle having a prime mover, front and rear propeller shafts, a center differential driven by the prime mover and drivingly connected to said propeller shafts, front and rear differentials including terminal elements and being driven by the front and rear propeller shafts, respectively, and front and rear pairs of half axles drivingly connected to the terminal elements of the front and rear differentials, that improvement in braking means characterized by the combination of two front brake elements each connected to rotate with a respective one of the front half axles, a rear brake element effectively connected to said rear differential to rotate with said rear propeller shaft, said rear and two front brake elements being substantially uniformly sized, and three substantially uniformly sized stationary friction elements each mounted and adapted to frictionally engage one of said brake elements so that substantially twice the braking effort is applied to the front half axles as is applied to the rear half axles.

3. In an automotive vehicle having a prime mover and front and rear pairs of traction wheels, the combination comprising a center differential driven from the prime mover, front and rear differentials each having a planet carrier connected to be driven from said center differential and each having two output sun gears, front and rear pairs of universally jointed half axles having their inner ends splined for axial movement within respective ones of said sun gears and connected at their outer ends with respective ones of said traction wheels, three substantially identical brake discs, means journaling two of said discs on the carrier of said front differential, means drivingly connecting said two discs with respective ones of the front half axles while permitting axial movement of the latter, means non-rotatively mounting the third of said discs on the planet carrier of said rear differential, and three substantially identical stationary brake shoes adapted to have pressurized frictional engagement with respective ones of said discs so that the braking effort applied to said third disc is divided by said rear differential between the rear wheels and the braking efforts of said two discs are applied to respective ones of the two front wheels.

4. In an automotive vehicle having front and rear propeller shafts driven from a center differential, front and rear differentials each having an intermediate element driven from a respective one of said propeller shafts and two terminal elements, and front and rear pairs of half axles carrying traction wheels and drivingly connected to the terminal elements of the front and rear differentials, the combination comprising three substantially identical brake elements, means journaling two of the brake elements on the intermediate element of the front differential, means connecting said two brake elements to respective ones of the front differential terminal elements for rotation therewith, said last mentioned means including axially slidable pin and slot means on the front differential terminal elements and the brake elements, respectively, for accommodating limited axial movement therebetween, means non-rotatably connecting the third of said brake elements to the intermediate element of said rear differential, and three friction elements, each of said last-named elements being stationarily mounted on the vehicle adjacent a corresponding one of said brake elements and adapted to have pressurized frictional engagement with respective ones of said brake elements.

5. In an automotive vehicle having front and rear propeller shafts driven from a center differential, front and rear differentials each having an intermediate element driven from a respective one of said propeller shafts and two terminal elements, and front and rear pairs of half axles carrying traction wheels and drivingly connected to the terminal elements of the front and rear differentials, the combination comprising three substantially identical brake elements, means journaling two of the brake elements on the intermediate element of the front differential, means connecting said two brake elements to respective ones of the front differential terminal elements for rotation therewith, said last mentioned means including axially slidable means on each of said front differential terminal elements and the brake elements, respectively, for assuring rotative driving connection between the elements while accommodating limited axial movement therebetween, means non-rotatably connecting the third of said brake elements to the intermediate element of said rear differential, and three friction elements, each of said last-named elements being stationarily mounted on the vehicle adjacent a corresponding one of said brake elements and adapted to have pressurized frictional engagement with respective ones of said brake elements.

6. In an automotive vehicle having a prime mover, front and rear propeller shafts, a center differential driven by the prime mover and drivingly connected to said propeller shafts, the center differential having overrunning clutch means for preventing stalling of the vehicle due to slippage of one wheel, front and rear differentials including terminal elements and being driven by the front and rear propeller shafts, respectively, and front and rear pairs of half axles drivingly connected to the terminal elements of the front and rear differentials, that improvement in braking means characterized by the combination of two front brake elements each connected to rotate with a respective one of the front half axles, a rear brake element effectively connected to said rear differential to rotate with said rear propeller shaft, said rear and two front brake elements being substantially uniformly sized, and three substantially uniformly sized stationary friction elements each mounted and adapted to frictionally engage one of said brake elements, so that substantially twice the braking effort is applied to the front half axles as is applied to the rear half axles.

References Cited in the file of this patent
UNITED STATES PATENTS

| | | |
|---|---|---|
| 1,799,495 | Bendix | Apr. 7, 1931 |
| 1,901,276 | Adams | Mar. 14, 1933 |
| 1,948,195 | Zancan | Feb. 20, 1934 |
| 2,133,652 | Best | Oct. 18, 1938 |
| 2,255,383 | Hall | Sept. 9, 1941 |
| 2,353,554 | Gates | July 11, 1944 |
| 2,557,444 | Le Tourneau | June 19, 1951 |
| 2,635,704 | Herreshoff | Apr. 21, 1953 |
| 2,714,826 | Jasper | Aug. 9, 1955 |
| 2,717,521 | Andershock | Sept. 13, 1955 |
| 2,751,798 | Keese et al. | June 26, 1956 |
| 2,775,307 | Hill | Dec. 25, 1956 |
| 2,796,942 | Hill | June 25, 1957 |
| 2,796,943 | Rolt et al. | June 25, 1957 |
| 2,816,616 | Hill | Dec. 17, 1957 |